Sept. 6, 1927.

H. J. BURKHARDT

PRESSURE GAUGE

Filed Nov. 21, 1921

Inventor—
Henry J. Burkhardt.
by his Attorneys
Howson & Howson

Sept. 6, 1927. 1,641,838
H. J. BURKHARDT
PRESSURE GAUGE
Filed Nov. 21, 1921 3 Sheets-Sheet 2

Inventor- Henry J. Burkhardt, by his Attorneys Howson & Howson

Sept. 6, 1927.  H. J. BURKHARDT  1,641,838
PRESSURE GAUGE
Filed Nov. 21, 1921   3 Sheets-Sheet 3

Inventor:—
Henry J. Burkhardt.
by his Attorneys—
Howson & Howson

Patented Sept. 6, 1927.

1,641,838

UNITED STATES PATENT OFFICE.

HENRY J. BURKHARDT, OF MOUNT EPHRAIM, NEW JERSEY, ASSIGNOR TO J. E. LONERGAN COMPANY, OF PHILADELPHIA, PENNSYLVANIA, A CORPORATION OF PENNSYLVANIA.

PRESSURE GAUGE.

Application filed November 21, 1921. Serial No. 516,633.

One object of this invention is to provide a relatively simple and accurate device for actuating and thereafter resetting the recording or telltale hand of a pressure gauge, thermometer or like instrument and the invention further contemplates novel means for operatively connecting the telltale hand with the pressure or temperature actuated member of the gauge so that said hand shall be moved thereby in but one direction.

A further object of the invention is to provide novel means for preventing unauthorized operation of the device for resetting the telltale hand.

These objects and other advantageous ends I attain as hereinafter set forth, reference being had to the accompanying drawings, in which, Fig. 1 is a front elevation of a pressure gauge equipped with my invention;

Figure 2:
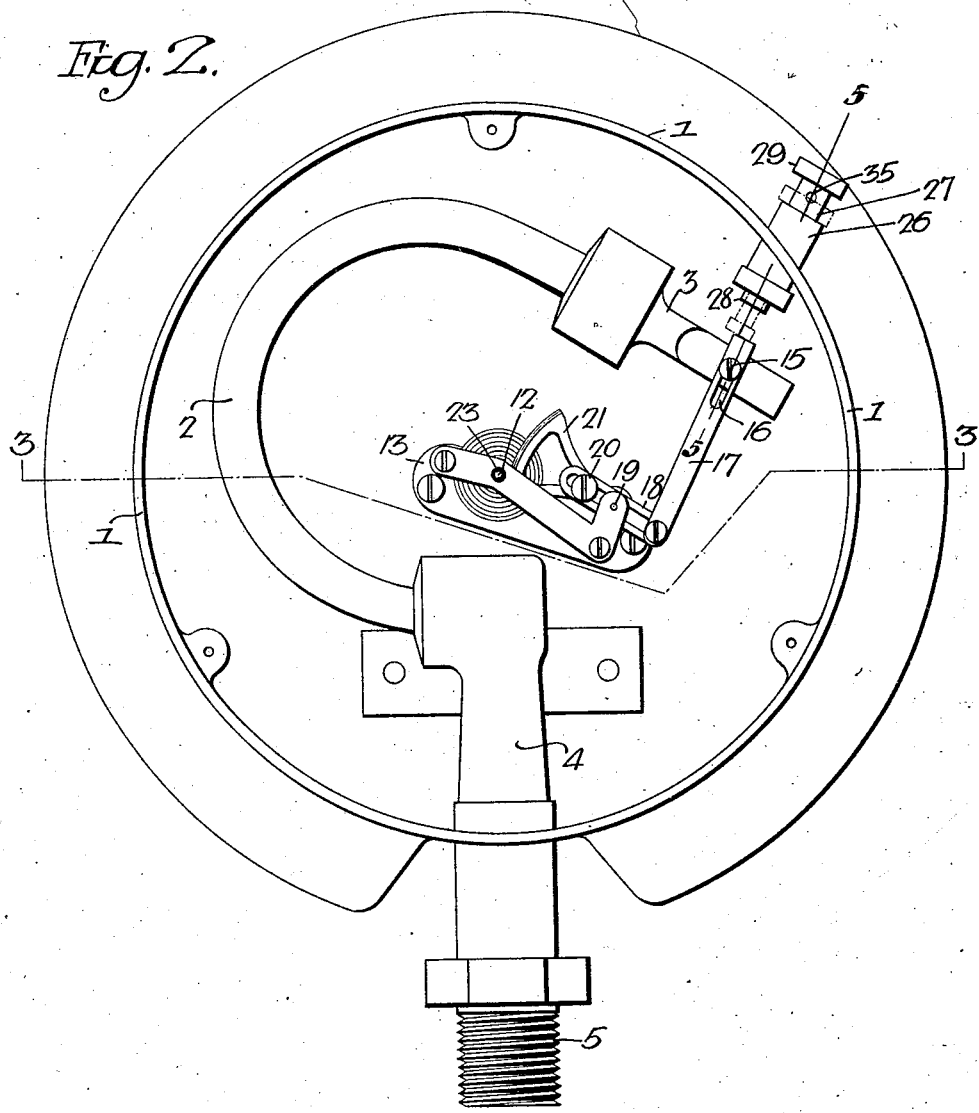
Fig. 2 is an elevation on a larger scale than Fig. 1, with the cover, dial and hands removed to show the mechanism.
Figure 3:
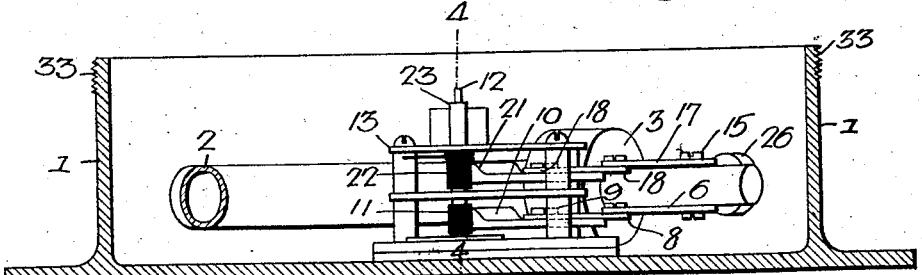
Fig. 3 is a transverse section on the line 3—3, Fig. 2.
Figure 4:
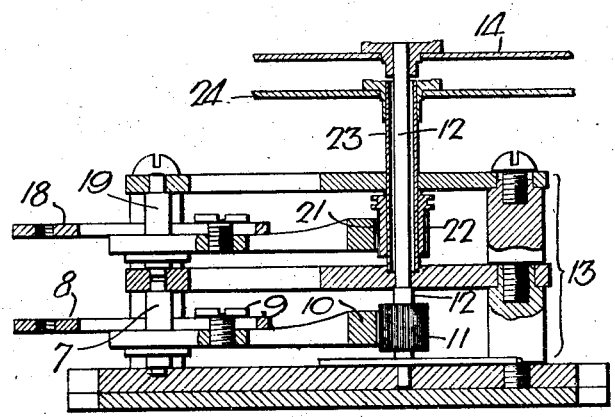
Fig. 4 is an enlarged vertical section on the line 4—4, Fig. 3, with portions of the hands in position.
Figure 6:
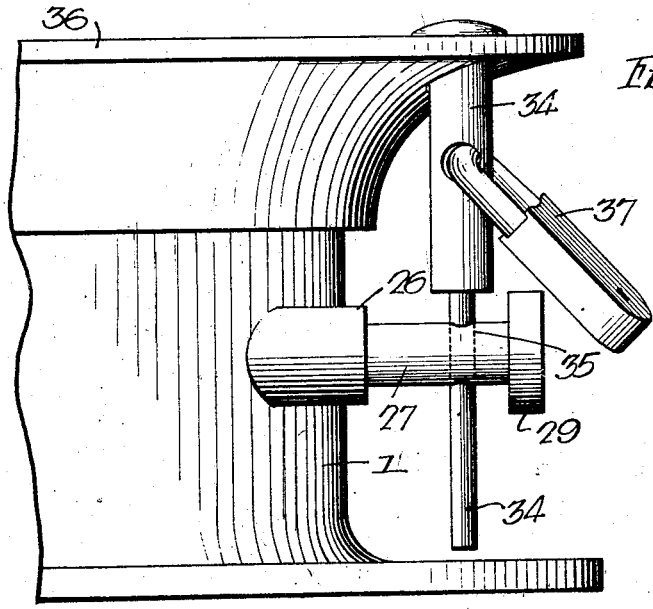
Fig. 6 is an enlarged fragmentary elevation showing the means for preventing unauthorized resetting of the telltale hand.

In the above drawings, 1 represents the body or main portion of the flattened cylindrical casing of a pressure gauge or other measuring or indicating instrument within which is mounted in the present case, a Bourdon tube 2 having a head 3 closing one end and at its opposite end connected to a conduit 4 extending out of the casing 1 and terminating in a threaded portion 5 for connection to any conduit or container of fluid under pressure. It is obviously immaterial whether the actuating member 2 be a Bourdon tube as shown or the movable or actuated element of a thermostat or other instrument, since my invention as hereafter described may be advantageously employed without essential change. Through a link 6 Fig. 3 the head 3 of the Bourdon tube or other pressure or temperature-responsive element is connected to one end of a bar 8 Fig. 4 longitudinally slotted to permit passage of a pivot spindle 7 and rigidly connected by a screw 9 to a toothed segment 10 rotatably mounted on said spindle. The teeth of this segment mesh with a pinion 11 fixed to a spindle 12 supported within suitable bearings of a frame structure 13 Fig. 2 mounted within the casing 1 and having fixed to its upper end a main or normal pressure indicating hand 14, as shown in Figs. 3 and 4.

The head 3 of the Bourdon tube or actuating element 2 has fixed in it a screw or pin 15 (Fig. 2) operative in a slot 16 of a link 17 whose opposite end is pivoted to one end of a bar 18 fulcrumed on a pivot 19 coaxial with the pivot 7 and like it carried by the frame 13. This bar 17 is adjustably connected through the bar 18 by a screw 20 with a second toothed segment 21 pivotally mounted on the spindle 19 and meshing with the teeth of a pinion 22 fixed to a sleeve 23 mounted coaxially with the spindle 12. Said sleeve has fixed to its upper end immediately under the hand 14, a telltale or maximum hand 24, usually having a color such as red, different from that of the normal indicating hand 14.

The above parts are so arranged that as the Bourdon tube 2 tends to straighten out under the action of fluid under pressure admitted to it from the conduit 4, it actuates both of the toothed segments 10 and 21 through the links 6 and 17; and through the pinion 11 and spindle 12 on the one hand, and the pinion 22 and sleeve 23 on the other, it actuates the two hands 14 and 24 to equal amounts. When however the pressure in the conduit 4 and tube 2 is decreased, the resulting motion of said tube is transmitted through the link 6, toothed segment 10, pinion 11 and spindle 12 to the hand 14. Owing however to the slot 16 in the link 17, said movement is not transmitted to the telltale or maximum hand 24, which therefore remains stationary at the furthest point to which it was moved by the action of the Bourdon tube. It therefore indicates on the graduated face plate or dial 25 the maximum pressure of the fluid in the conduit 4.

In order to conveniently reset the telltale hand or needle 24, I mount in the side of the casing 1 a guide sleeve 26 (Fig. 5) for the reception of a plunger 27 having on its inner end within the casing a retaining collar 28 and on its outer end having a head 29. Within the sleeve 26 under said head I provide a spring 30 whereby the plunger and head are normally retained in their outermost positions.

The plunger 27 with its head and their associated parts are so proportioned that when it has been forced inwardly as far as possible, it will engage the end of the link 17 and so actuate said link with the segment 21 and sleeve 23 that the telltale or maximum hand is returned to its zero position. Thus after any maximum reading of the gauge has been noted, the maximum hand may be moved to zero or if the gauge is still under pressure, restored to a position in which its reading is identical with that of the normal hand 14.

Figure 1:
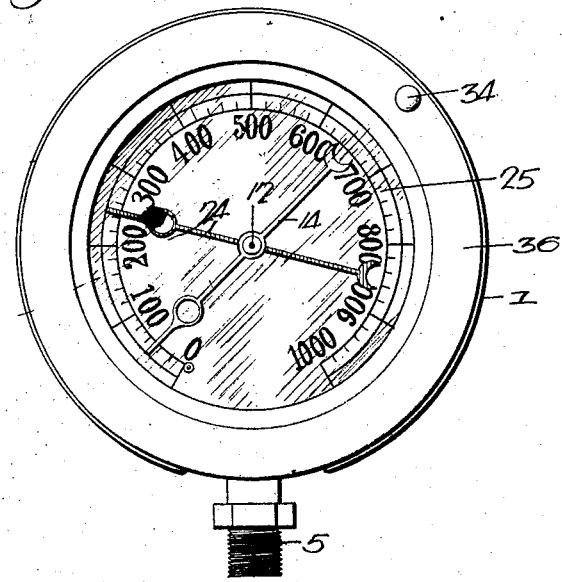
Figure 5:
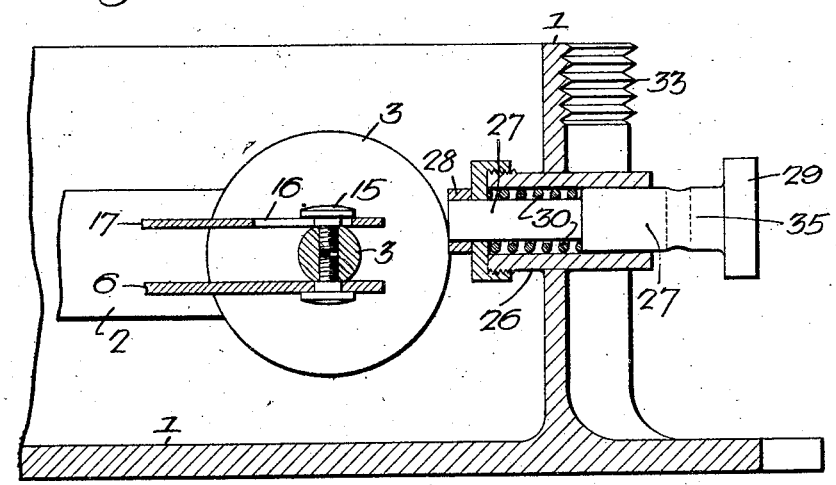
Fig. 5 is a fragmentary section on the line 5—5, Fig. 2.

As shown in Figs. 3 and 5, the outer edge of the cylindrical casing 1 is threaded as indicated at 33 for the reception of the bezel or cover and in order to prevent the recording hand being reset by unauthorized persons, I provide the flange of said cover with an opening for the reception of a headed locking pin 34 having a reduced end formed to fit into a transverse hole 35 in the plunger 27. When so engaged by the pin the plunger 27 cannot be pushed in far enough to cause movement of the telltale hand and the withdrawal of the pin 34 is prevented by a padlock 37 whose hasp is passed through a transverse hole in said pin. The parts are so proportioned that the cover 36 cannot be unscrewed from the casing because the pin 34 cannot be withdrawn from the hole in the plunger 27 as long as the hasp of the padlock 37 is in place. Obviously therefore the telltale hand will remain in its position of maximum deflection until it is reset by the person having the key of the padlock 37, since this latter must be removed before the locking pin can be withdrawn from the plunger.

I claim:

1. The combination in a pressure gauge, of a dial having a series of pressure markings thereon, two coaxially pivoted and independently movable indicating hands both co-operating directly with the said dial, a pressure responsive member, and two separate trains of mechanism connecting the said member with the two hands respectively to move them simultaneously and uniformly in one direction as the said member moves in one direction in accordance with increasing pressure, one of the said trains including a lost motion connection which permits the corresponding hand to remain in a maximum pressure position when the said member and the other hand move in the other direction in accordance with decreasing pressure.

2. The combination in a pressure gauge, of a dial having a series of pressure markings thereon, two coaxially pivoted and independently movable indicating hands both co-operating directly with the said dial, a pressure responsive member, two separate trains of mechanism connecting the said member with the two hands respectively to move them simultaneously and uniformly in one direction as the said member moves in one direction in accordance with increasing pressure, one of the said trains including a lost motion connection which permits the corresponding hand to remain in a maximum pressure position when the said member and the other hand move in the other direction in accordance with decreasing pressure, means for resetting the said maximum pressure hand, and a locking device adapted to prevent the operation of the resetting means.

HENRY J. BURKHARDT.